(12) United States Patent
Garner et al.

(10) Patent No.: US 11,678,001 B2
(45) Date of Patent: Jun. 13, 2023

(54) MODULATING A QUALITY OF MEDIA CONTENT

(71) Applicant: Roku, Inc., San Jose, CA (US)

(72) Inventors: Greg Garner, Springdale, AR (US); David Stern, Los Gatos, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 16/909,222

(22) Filed: Jun. 23, 2020

(65) Prior Publication Data

US 2021/0400325 A1    Dec. 23, 2021

(51) Int. Cl.
*H04N 21/2662* (2011.01)
*H04N 21/24* (2011.01)
*H04N 21/258* (2011.01)
*G06N 20/00* (2019.01)
*H04N 21/25* (2011.01)

(52) U.S. Cl.
CPC ......... *H04N 21/2662* (2013.01); *G06N 20/00* (2019.01); *H04N 21/2402* (2013.01); *H04N 21/251* (2013.01); *H04N 21/25841* (2013.01)

(58) Field of Classification Search
CPC ........... H04N 21/2662; H04N 21/2402; H04N 21/251; H04N 21/25841; G06N 20/00
See application file for complete search history.

(56) References Cited

U.S. PATENT DOCUMENTS

| | | | | |
|---|---|---|---|---|
| 10,205,638 | B1* | 2/2019 | Angrish | H04L 41/22 |
| 2005/0138658 | A1* | 6/2005 | Bryan | H04H 60/43 |
| | | | | 725/46 |
| 2013/0035059 | A1* | 2/2013 | Liu | H04M 15/80 |
| | | | | 455/406 |
| 2017/0206529 | A1* | 7/2017 | Raleigh | H04W 4/24 |
| 2017/0366423 | A1* | 12/2017 | Griot | H04L 67/568 |
| 2018/0013629 | A1* | 1/2018 | Phillips | H04L 12/14 |

* cited by examiner

*Primary Examiner* — Joshua D Taylor
(74) *Attorney, Agent, or Firm* — Sterne, Kessler, Goldstein & Fox P.L.L.C.

(57) ABSTRACT

The present disclosure is directed to systems and methods for modulating the quality of media content based on aggregate data usage. For example, a method may include: collecting usage data information from a plurality of locations; determining a data cap for each of the plurality of locations; training a machine learning model using the usage data information and the data cap; predicting, using the machine learning model, whether a location is going to exceed its associated data cap, the location being a new location or an existing one of the plurality of locations; and determining whether the modulate a quality of media content transmitted to the location based on the prediction.

20 Claims, 3 Drawing Sheets

MODULATING A QUALITY OF MEDIA CONTENT

BACKGROUND

A data cap, also known as a bandwidth cap, is a limit imposed by service providers, e.g., Internet Service Providers (ISPs) and mobile service providers, on the amount of data transferred to and from client devices associated with a user account. The data cap may be based on a specified level of throughput over a given cycle, e.g., number of gigabits per month, for a specified fee. In order prevent excessive use of data, service providers may implement data capping. Data capping may limit the total transfer capacity, upstream or downstream, of data over a medium. For example, a standard cap may limit the bitrate or speed of data transfer on an Internet connection in order to prevent users from consuming the entire transmission capacity of the medium. As another example, a lowered cap may reduce a user's bandwidth cap as a defensive measure and/or as a punishment for heavy use of the medium's bandwidth, which may happen without notifying the user. In some situations, users may be charged an additional fee for exceeding the data cap for a given cycle.

BRIEF SUMMARY

According to some aspects, an example embodiment is directed to a method that may include collecting usage data information from a plurality of locations. The method may also include determining a data cap for each of the plurality of locations. The method may also include training a machine learning model using the usage data information and the data cap information. The method may also include predicting, using the machine learning model, whether a location is going to exceed its associated data cap. The location may be a new location or an existing one of the plurality of locations. The method may also include determining whether the modulate a quality of media content transmitted to the location based on the prediction.

According to some aspects, an example embodiment is directed to a system that includes a memory and a processor coupled to the memory. The processor may be configured to collect usage data information from a plurality of locations. The processor may also be configured to determine a data cap for each of the plurality of locations. The processor may be configured to train a machine learning model using the usage data information and the data cap information. The processor may be configured to predict, using the machine learning model, whether a location is going to exceed its associated data cap. The location may be a new location or one of the plurality of locations. The processor may be configured to determine whether the modulate a quality of media content transmitted to the location based on the prediction.

According to some aspects, an example embodiment is directed to a non-transitory, tangible computer-readable device having instructions stored thereon that, when executed by at least one computing device, causes the at least one computing device to perform operations. The operations may include collecting usage data information from a plurality of locations. The operations may also include determining a data cap for each of the plurality of locations. The operations may also include training a machine learning model using the usage data information and the data cap information. The operations may also include predicting, using the machine learning model, whether a location is going to exceed its associated data cap. The location may be a new location or one of the plurality of locations. The operations may also include determining whether the modulate a quality of media content transmitted to the location based on the prediction.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is to be appreciated that the Detailed Description section, and not the Summary and Abstract sections, is intended to be used to interpret the claims. The Summary and Abstract sections may set forth one or more but not all example embodiments as contemplated by the inventor(s), and thus, are not intended to limit the appended claims in any way.

Figure 1:
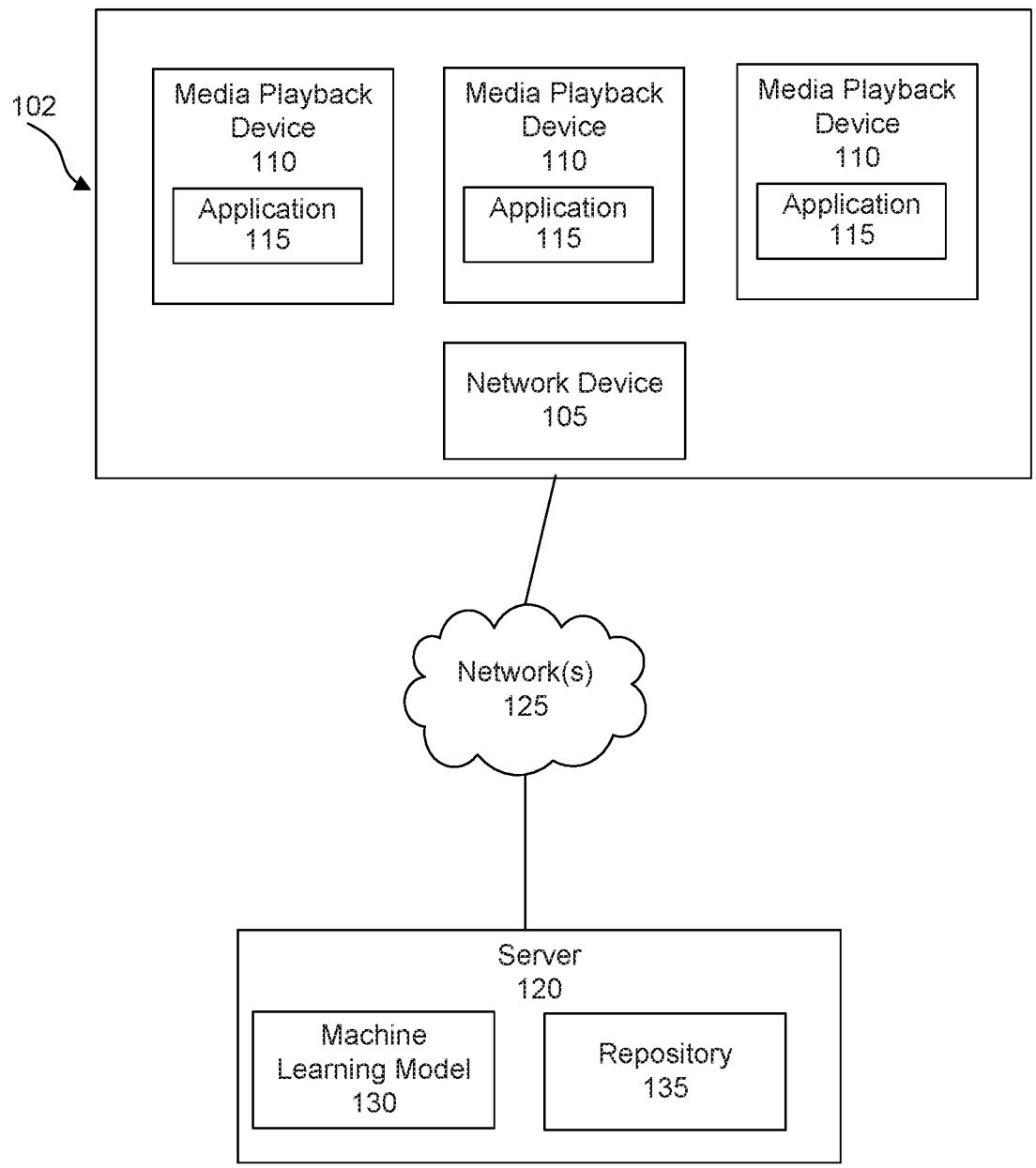
FIG. 1 is a block diagram of a system, according to some example embodiments.

FIG. 1 is a diagram of an example environment 100 in which example systems and/or methods may be implemented. As shown in FIG. 1, an environment 100 may include a locations 102 having a network device 105 and plurality of media playback devices 110, a server 120, a network 125. Devices of the environment 100 may interconnect via wired connections, wireless connections, or a combination of wired and wireless connections. Devices of environment 100 may include a computer system 300 shown in FIG. 3, discussed in greater detail below. Although the environment 100 is shown as one location 102, this is merely for illustrative purposes, and the environment 100 may include any number of locations 102.

In some embodiments, the networking device 105 may be, for example, a router, a switch, an access points, a gateway, or any other device configured to provide an Internet connection to devices, e.g., the plurality of media playback devices 110, at the location 102, as should be understood by those of ordinary skill in the art.

In some embodiments, the plurality of media playback devices 110 may be any device that may be used to stream content. For example, the plurality of media playback devices 110 may be, without limitation, a media player, television, a wireless device, a smartphone, a tablet computer, a laptop/mobile computer, a handheld computer, a server computer, an in-appliance device, Internet of Things (IoT) device, streaming media player, a game console, and/or an audio/video receiver. The plurality of media playback device 110 may include one or more applications 115 for streaming media content from a respective provider. For example, the one or more applications 115 may be applications that provide media content, such as, but not limited to, video content, audio content, or the like. Although the location 102 is shown as having three media playback devices 110, this is merely an example number of media playback devices 110, and more or less media playback devices 110 are contemplated in accordance of aspects of the present disclosure. For example, the location 102 may include a single media playback device 110.

The server 120 may include a server device (e.g., a host server, a web server, an application server, etc.), a data center device, or a similar device, capable of communicating with the client device 110 via the network 125. In some embodiments, the server 120 may include a machine learning model 130 trained to modulate a quality of media content based on aggregate data usage and a repository 135, e.g., main memory 308 or secondary memory 310 of FIG. 3, for storing data related to the data usage of each location 102.

The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
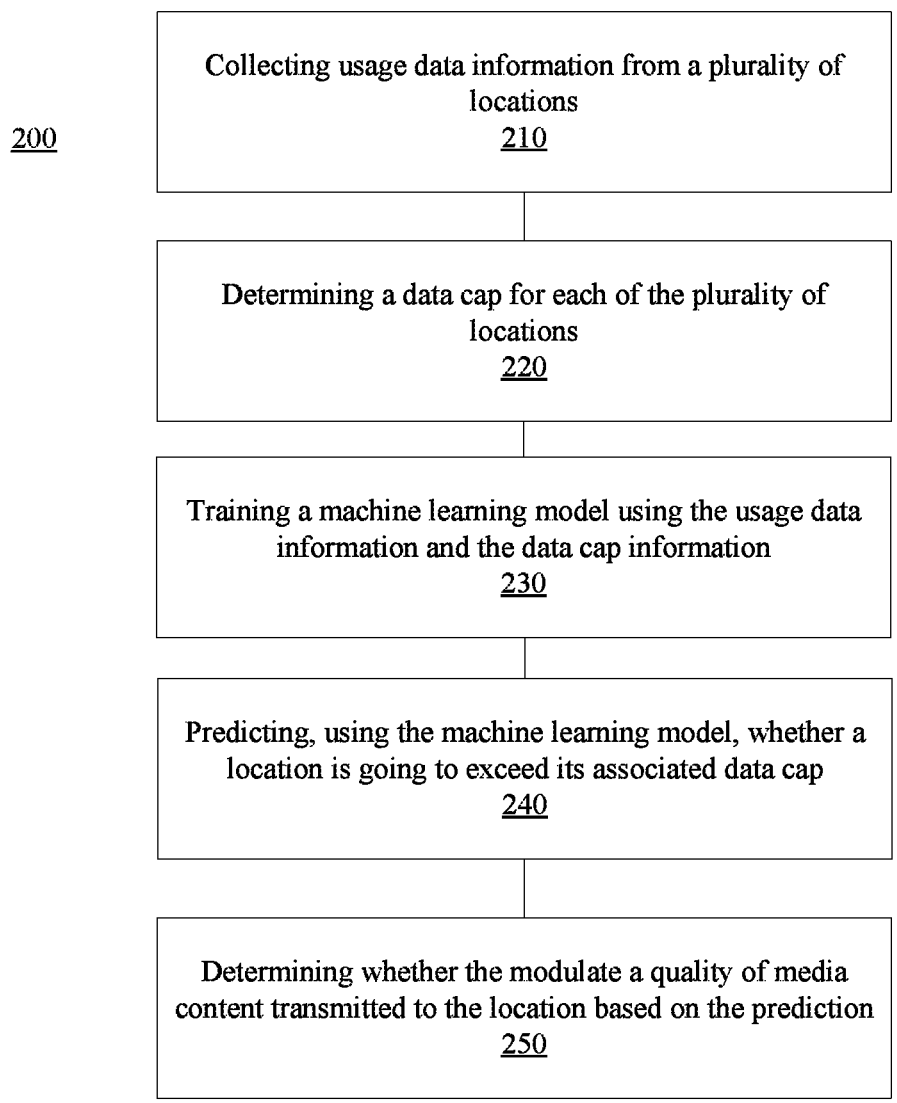
FIG. 2 is a flowchart illustrating a process for modulating the quality of media content based on aggregate data usage, according to some example embodiments.

FIG. 2 is a flow chart of an example method 200 for modulating the quality of media content based on aggregate data usage. In some embodiments, one or more processes described with respect to FIG. 2 may be performed by a server device (e.g., the server 120 of FIG. 1).

In some embodiments, at 210, the method 200 may include collecting usage data information from a plurality of locations, e.g., location 102. For example, the data usage information may be based on the amount content streamed over one or more media playback devices, e.g., the media playback devices 110, at the location 102. In some embodiments, the usage data information may be collected from a plurality of locations 102. The data usage information may be collected over an extended period of time, e.g., from months up to years, for each location 102. The data usage information from the location(s) 102 may be stored in the repository 135.

In some embodiments, at 220, the method may include determining a data cap for each of the plurality of locations 102. For example, the server 120 may determine the data cap based on a response received from a user at the location. To achieve this, a message may displayed on one of the media playback devices 110 prompting the user to enter the data cap associated with their ISP. In some embodiments, the server 120 may determine, with the consent of the user, the data cap based on communications with the ISP. In some embodiments, the server 120 may determine the data cap based on detecting how much data has been consumed when the ISP begins to modulate data available to the location 102. In some embodiments, the server 120 determine the data cap by using an application programming interface (API) that communicates with a network device, e.g., the network device 105, at the location 102, with the network device 105 notifying the server 120 of the data cap for the location. The data cap from the location(s) 102 may be stored in the repository 135.

At 230, the method 200 may further include training a machine learning model, e.g., the machine learning model 130 of FIG. 1, using the usage data information and the data cap information stored in the repository 135. For example, the machine learning model 130 may be trained using a combination of one or more supervised algorithms, semi-supervised algorithms, and/or unsupervised algorithms. In some embodiments, the data usage information and the data cap information may be used as a training data set for the machine learning model 130. For example, the machine learning model 130 may be trained using one or more pattern recognition algorithms to identify patterns in how much data is being consumed by each location 102 and to what extent each location 102 is exceeding its data cap.

In some embodiments, the machine learning model 130 may be also trained using the data usage information and the data cap information to identify different categories of locations. For example, the machine learning model 130 may be trained using a density-based clustering technique such as, but not limited to, a K-means clustering algorithm or a support-vector clustering algorithm, to cluster the data usage information and the data cap information into the different categories. For example, the clusters may be based on a number of users, ages of each user at each of the locations 102, past viewership, employment status, e.g., stay-at-home parents, retired, unemployed, working from home, or type of location, e.g., residential versus commercial or public versus private. It should be understood by those of ordinary skill in the arts that there are merely example types of clusters, and that other clusters are further contemplated in accordance with aspects of the present disclosure.

The machine learning model 130 may be trained to associate the data usage information with one or more circumstances of data usage. For example, the machine learning model 130 may be trained using an association algorithm, such as, but not limited to, an apriori algorithm, eclat algorithm, or a frequent-pattern growth (FP-growth) algorithm to determine a correlation between the data usage and the one or more circumstances of data usage. As one example, the machine learning model 130 may be trained to associate increased data usage with sporting events that may occur on a periodic basis, e.g., annually, every four years, etc., and consume large amounts of bandwidth. As another example, the machine learning model may be trained to associate increased/decreased data usage with changes seasonal changes, e.g., some locations 102 may consume more data in the winter and less data in the summer (or vice-versa) or with the academic school year, e.g., some locations 102 consume more data during academic breaks. It should be understood by those of ordinary skill in the art that these are merely examples of circumstances of data usage, and that other circumstances of data usage are further contemplated in accordance with aspects of the present disclosure.

The machine learning model 130 may be trained to associate the data usage information with one or more users. In some embodiments, each of the media playback devices 110 at a given location 102 may be accessed using a user profile, and the machine learning model 130 may be trained using one of the association algorithms described herein to associate the data usage with each the one or more users. In some embodiments, the media playback devices 110 may controlled using a remote control device, and based on the interactions with the remote control, the machine learning model 130 may be trained to distinguish between each user and to associate the data usage with each the one or more accordingly. For example, the machine learning model 130 may be trained to distinguish between the users based on how each user handles the remote control device, e.g., a cadence when pressing buttons on the remote control device, an amount of pressure used when pressing buttons on the remote control device, or the like. As another example, the remote control device may include a voice activation feature, and the machine learning model 130 may be trained to distinguish between the users based on a voice recognition of each user. The machine learning model 130 may be trained to associate the data usage information with one or more of the media playback devices 110. In this way, the machine learning model 130 may monitor which media playback devices 110 are consuming the bandwidth.

At 240, the method 200 may include predicting, using the machine learning model 130, whether a location 102 is going to exceed its associated data cap. The machine learning model 130 may also be trained using a regression algorithm to predict when a location 102 is going to exceed its data cap. In some embodiments, the regression algorithm may be, for example, a linear regression, a regression tree, a lasso regression, and/or a multivariate regression. In some embodiments, based on a current usage through a period of time in a usage cycle and the historical data usage, the machine learning model 130 may predict whether the location 102 is going to exceed the data cap based on whether or not the location 102 has exceeded the data cap in similar situations in the past.

In some embodiments, the server 120 may be also configured to continuously collect the usage data information from each of the plurality of locations 102. Thus, in some embodiments, the machine learning model 130 may be continuously trained based on the continuously received usage data information. That is, the server 120 may continuously monitor each of the plurality of locations 102, as well as, any changes in the consumption of data at each location, which may be used by the machine learning model 130 to continuously learn about how each location 102 is consuming data and apply that that knowledge to predict whether a given location 102 will exceed its data cap. For example, with respect to existing locations, the machine learning model 130 may identify new trends in data consumption, and the machine learning model 130 may thus provide predictions accordingly.

In some embodiments, the prediction may be based on the historical usage and the one or more circumstances of data usage. For example, while a location 102 may not regularly exceed the data cap on a month-to-month basis, the machine learning model 130 may predict that a given location 102 may exceed the data cap based on an increase in data usage due to an upcoming sporting tournament/event, an increase in the number of users due to, for example, school breaks or the like, or to seasonal changes.

In some embodiments, the prediction may be based on the historical usage and the one or more users. For example, the machine learning model 130 may track whether or not a user associated with high consumption has been consuming data in a given cycle. When a user associated with high consumption has been using one or more of the media playback devices 110, the machine learning model 130 may predict that the location 102 may exceed the data cap for the current cycle. Similarly, in some embodiments, the prediction may be based on the historical usage and the usage of the media playback devices 110. For example, the machine learning model 130 may track whether or not a media playback device associated with high consumption has been consuming data in a given cycle. When the media playback device associated with high consumption has been used frequently, the machine learning model 130 may predict that the location 102 may exceed the data cap for the current cycle.

In some embodiments, for new locations without historical usage information, the machine learning model 130 may predict whether the new location is going to exceed its data cap based on whether other locations with a comparable profile have exceeded the data cap in similar situations in the past. The machine learning model 130 may analyze characteristics of the new location and identify one or more clusters of locations having similar characteristics. Once other locations with similar characteristics have been identified, the machine learning model 130 may then predict whether the new location is going to exceed its data cap based on the historical usage information of the identified locations.

At 250, the method may include determining whether the modulate a quality of media content transmitted to the location based on the prediction. For example, in response to the machine learning model 130 predicting that a location 102 is going to exceed the data cap, the server 120 may automatically modulate the quality of the media content based on such prediction. In some embodiments, the server 120 may modulate the quality of the media content when a current consumption exceeds a percentage of the data cap, e.g., 75%, 85%, 90%, etc.

In some embodiments, determining whether to modulate the quality of the media content may be based on user feedback. For example, in response to the machine learning model 130 predicting that a location 102 is going to exceed the data cap, the server 120 may transmit a message the at least one media playback device 110 at the location 702 notifying the user of the prediction and prompting the user to select whether or not to modulate the quality of the media content. For example, the user may select "Yes," "No," "Not Now," or "Never," and based on this selection, the server 120 may determine whether or not to modulate the quality of the media content. In some embodiments, the user may also provide input indicating when or how to modulate the quality of the media content. For example, the user may select a specific date to begin modulating the quality of the media content, a number of days after which to begin modulating the quality of the media content, a specific percentage of overall consumption at which to begin modulating the quality of the media content, which device(s) to begin modulating the quality of the media content on, which user profile(s) to begin modulating the quality of the media content for, which applications, e.g., the applications 115 of FIG. 1, to begin modulating quality of the media content on, or certain time(s) of day or day(s) of the week during which to begin modulating quality of the media content.

In some embodiments, in response to determining to modulate the media content quality, the server 120 may be configured to modulate the quality of the media content transmitted to the location 102. For example, for video content, the server 120 may reduce the quality of the video content from a higher quality resolution to a lower quality resolution, e.g., from 8 k to 4 k, 1080p, 1080i, or 720p, or from 4 k to 1080p, 1080i, or 720p, and so on and so forth. For audio content, the server may reduce the quality of the audio content higher quality resolution to a lower quality resolution, e.g., from high-definition (HD) audio to standard audio. In some embodiments, the server 120 may to modulate the media content quality based on the user selection. For example, the server 120 may modulate the media content quality on the date specified by the user, after the number of days specified by the user, after a specific percentage of overall data has been consumed, for the device(s) specified by the user, for the user profile(s) specified by the user, for the applications specified by the user, or during certain time(s) of day or day(s) of the week specified by the user. By modulating the quality of the media content transmitted to the location, the server 120 may reduce the amount of data consumed by the location 102, thereby reducing a likelihood that the location 102 will incur additional fees for exceeding the data cap.

Figure 3:
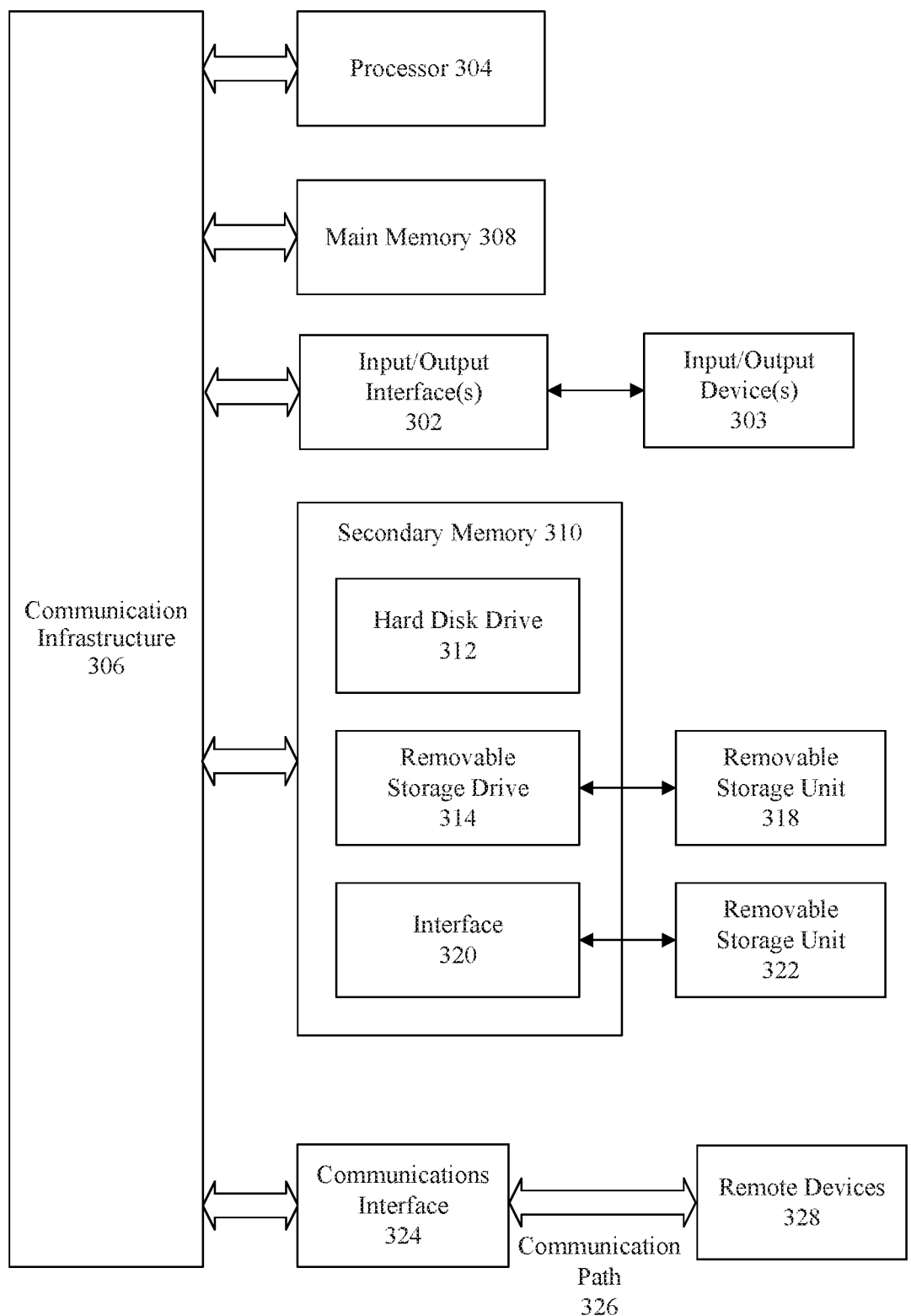
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein, such as computers available from International Business Machines, Apple, Sun, HP, Dell, Sony, Toshiba, etc.

Computer system 300 includes one or more processors (also called central processing units, or CPUs), such as a processor 304. Processor 304 is connected to a communication infrastructure or bus 306. Processor 304 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., which communicate with communication infrastructure or bus 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Embodiments of the present embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer-implemented method comprising:
    collecting, by at least one server, usage data information from a plurality of locations, wherein at least a location of the plurality of locations includes a plurality of media playback devices accessible by one or more users and coupled to a network device located at the location that is further coupled to the at least one server through a network;
    determining, by the at least one server, a data cap for each of the plurality of locations including the location based on a notification received through the network from the network device located at the location that is coupled to the plurality of media playback devices at the location;
    training a machine learning model using multiple usage data information and data caps including the usage data information and the data cap received from each of the plurality of locations to associate the usage data information with one of the one or more users based on how the one of the one or more users handles a remote control device to control the plurality of media playback devices;
    predicting, using the machine learning model, based on the usage data information associated with the one of the one or more users, whether the location is going to exceed its associated data cap; and
    determining whether to modulate a quality of media content transmitted to the location based on the prediction.

2. The method of claim 1, wherein determining whether to modulate the quality of the media content comprises automatically modulating the quality of the media content in response to the machine learning model predicting that the location is going to exceed the data cap.

3. The method of claim 2, wherein automatically modulating the quality of the media content comprises automatically modulating the quality of the media content when a current consumption exceeds a percentage of the data cap.

4. The method of claim 1, further comprising:
    notifying a user at the location that the location is predicted to exceed the data cap; and
    prompting the user to select whether or not to modulate the quality of the media content, wherein determining whether to modulate the quality of the media content is based on the user selection.

5. The method of claim 1, wherein collecting the usage data information comprises continuously collecting usage data information, and wherein the method further comprises training the machine learning model based on the continuously collected usage data information.

6. The method of claim 1, wherein predicting whether the location is going to exceed the data cap is based on a historical usage at the location.

7. The method of claim 6, wherein predicting whether the location is going to exceed the data cap is based on the historical usage at the location and one or more circumstances of data usage.

8. The method of claim 1, wherein predicting whether the location is going to exceed the data cap is based on historical usage at other locations from among the plurality of locations having a comparable profile as the location.

9. A system, comprising:
    at least one processor configured to execute instructions, the instructions causing the at least one processor to:
    collect usage data information from a plurality of locations, wherein at least a location of the plurality of locations includes a plurality of media playback devices accessible by one or more users and coupled to a network device located at the location that is further coupled to the system through a network;
    determine a data cap for each of the plurality of locations including the location based on a notification received through the network from the network device located at the location that is coupled to the plurality of media playback devices at the location;
    train a machine learning model using multiple usage data information and data caps including the usage data information and the data cap received from each of the plurality of locations to associate the usage data information with one of the one or more users based on how the one of the one or more users handles a remote control device to control the plurality of media playback devices;

predict, using the machine learning model, based on the usage data information associated with the one of the one or more users, whether the location is going to exceed its associated data cap; and determine whether to modulate a quality of media content transmitted to the location based on the prediction.

10. The system of claim 9, wherein to determine whether to modulate the quality of the media content, the instructions cause the at least one processor to automatically modulate the quality of the media content in response to the machine learning model predicting that the location is going to exceed the data cap.

11. The system of claim 10, wherein to automatically modulate the quality of the media content, the instructions cause the at least one processor to automatically modulate the quality of the media content when a current consumption exceeds a percentage of the data cap.

12. The system of claim 9, wherein the instructions further cause the at least one processor to:

notify a user at the location that the location is predicted to exceed the data cap; and cause a prompt to be displayed to the user, the prompt including a selection as to whether or not to modulate the quality of the media content, wherein to determine whether to modulate the quality of the media content is based on the user selection.

13. The system of claim 9, wherein to collect the usage data information, the instructions cause the at least one processor to continuously collect usage data information, and wherein the instructions further cause the at least one processor to train the machine learning model based on the continuously collected usage data information.

14. The system of claim 9, wherein the location is one of the plurality of locations, and wherein to predict whether the location is going to exceed the data cap is based on a historical usage at the location.

15. The system of claim 14, wherein to predict whether the location is going to exceed the data cap is based on the historical usage at the location and one or more circumstances of data usage.

16. The system of claim 9, wherein to predict whether the location is going to exceed the data cap is based on historical usage at other locations from among the plurality of locations having a comparable profile as the location.

17. A non-transitory, tangible computer-readable medium having instructions stored thereon that, when executed by at least one computing device, cause the at least one computing device to perform operations comprising:

collecting usage data information from a plurality of locations, wherein at least a location of the plurality of locations includes a plurality of media playback devices accessible by one or more users and coupled to a network device located at the location that is further coupled to the at least one computing device through a network;

determining a data cap for each of the plurality of locations including the location based on a notification received through the network from the network device located at the location that is coupled to the plurality of media playback devices at the location;

training a machine learning model using multiple usage data information and data caps including the usage data information and the data cap received from each of the plurality of locations to associate the usage data information with one of the one or more users based on how the one of the one or more users handles a remote control device to control the plurality of media playback devices;

predicting, using the machine learning model, based on the usage data information associated with the one of the one or more users, whether the location is going to exceed its associated data cap; and determining whether to modulate a quality of media content transmitted to the location based on the prediction.

18. The non-transitory, tangible computer-readable medium of claim 17, wherein, in response to the machine learning model predicting that the location is going to exceed the data cap, determining whether to modulate the quality of the media content comprises automatically modulating the quality of the media content when a current consumption exceeds a percentage of the data cap.

19. The non-transitory, tangible computer-readable medium of claim 17, wherein the location is one of the plurality of locations, and wherein predicting whether the location is going to exceed the data cap is based on a historical usage at the location.

20. The non-transitory, tangible computer-readable medium of claim 17, wherein predicting whether the location is going to exceed the data cap is based on historical usage at other locations from among the plurality of locations having a comparable profile as the location.

* * * * *